Oct. 6, 1942.  E. G. BERG ET AL  2,297,867
MIXING MACHINE
Filed Sept. 21, 1940  7 Sheets-Sheet 3
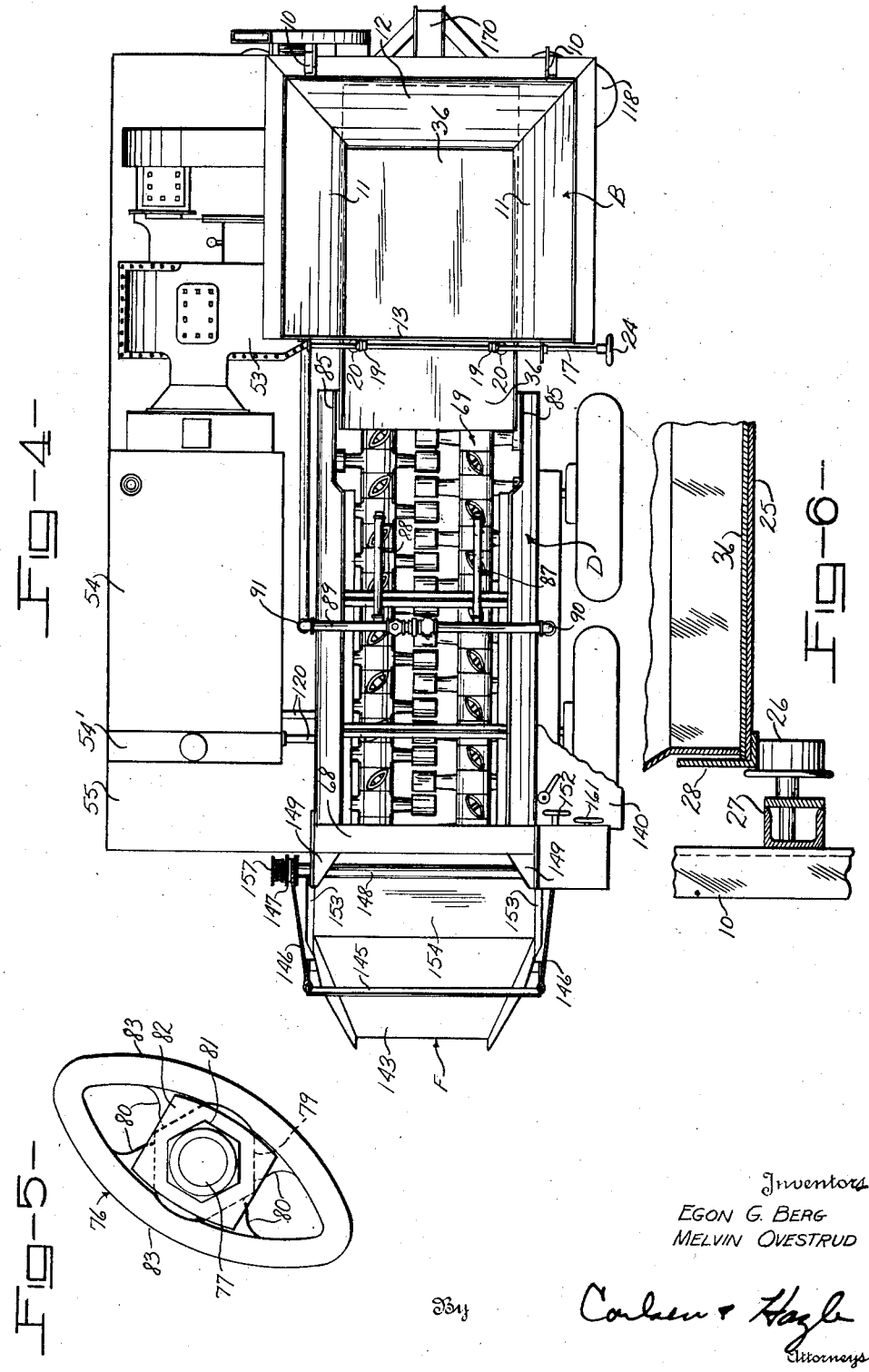
Inventors
EGON G. BERG
MELVIN OVESTRUD
By
Carlsen + Hagle
Attorneys Oct. 6, 1942.   E. G. BERG ET AL   2,297,867
MIXING MACHINE
Filed Sept. 21, 1940   7 Sheets-Sheet 4
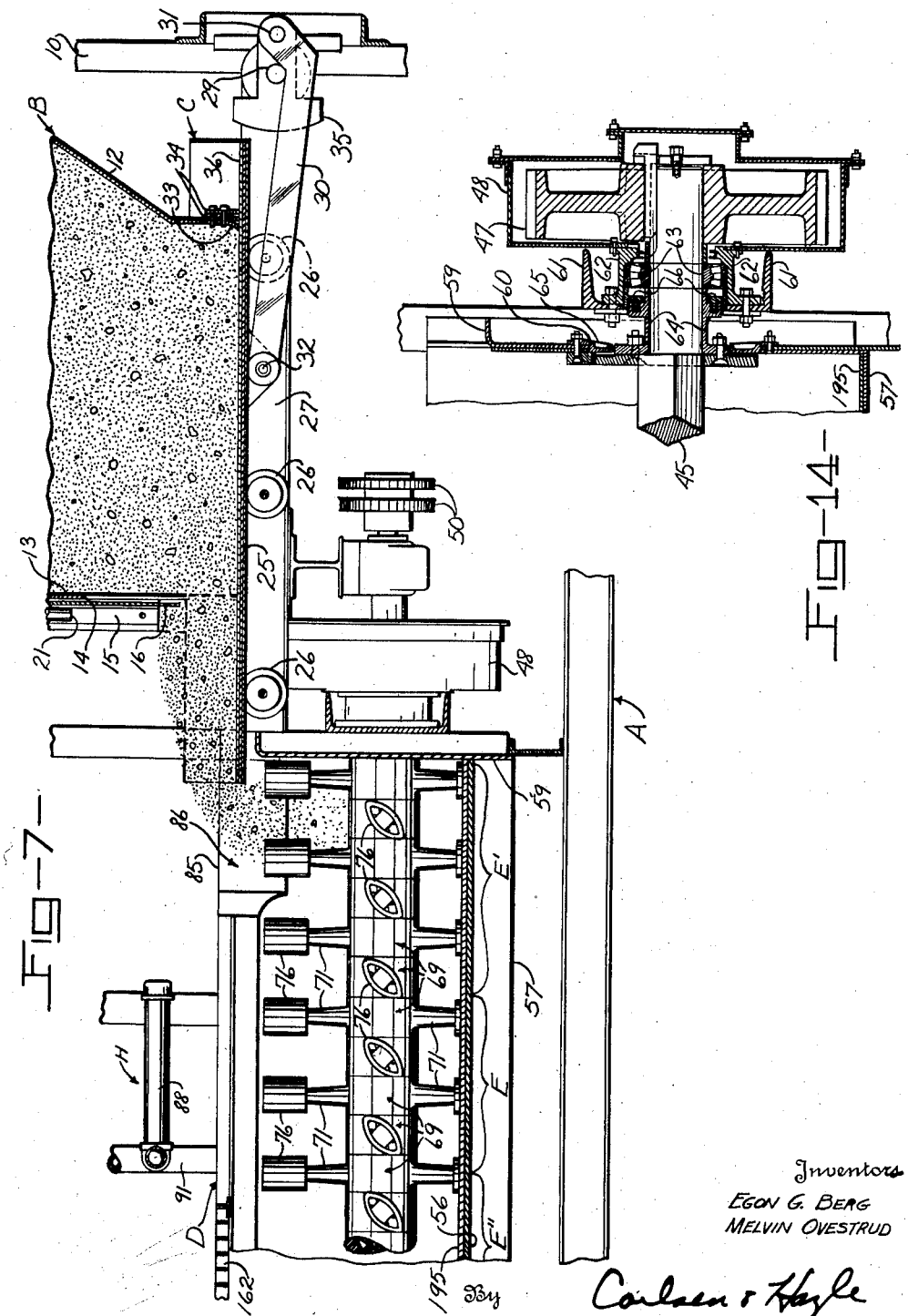
Inventors
EGON G. BERG
MELVIN OVESTRUD
By Carlsen & Hayle
Attorneys Oct. 6, 1942.  E. G. BERG ET AL  2,297,867
MIXING MACHINE
Filed Sept. 21, 1940  7 Sheets-Sheet 5
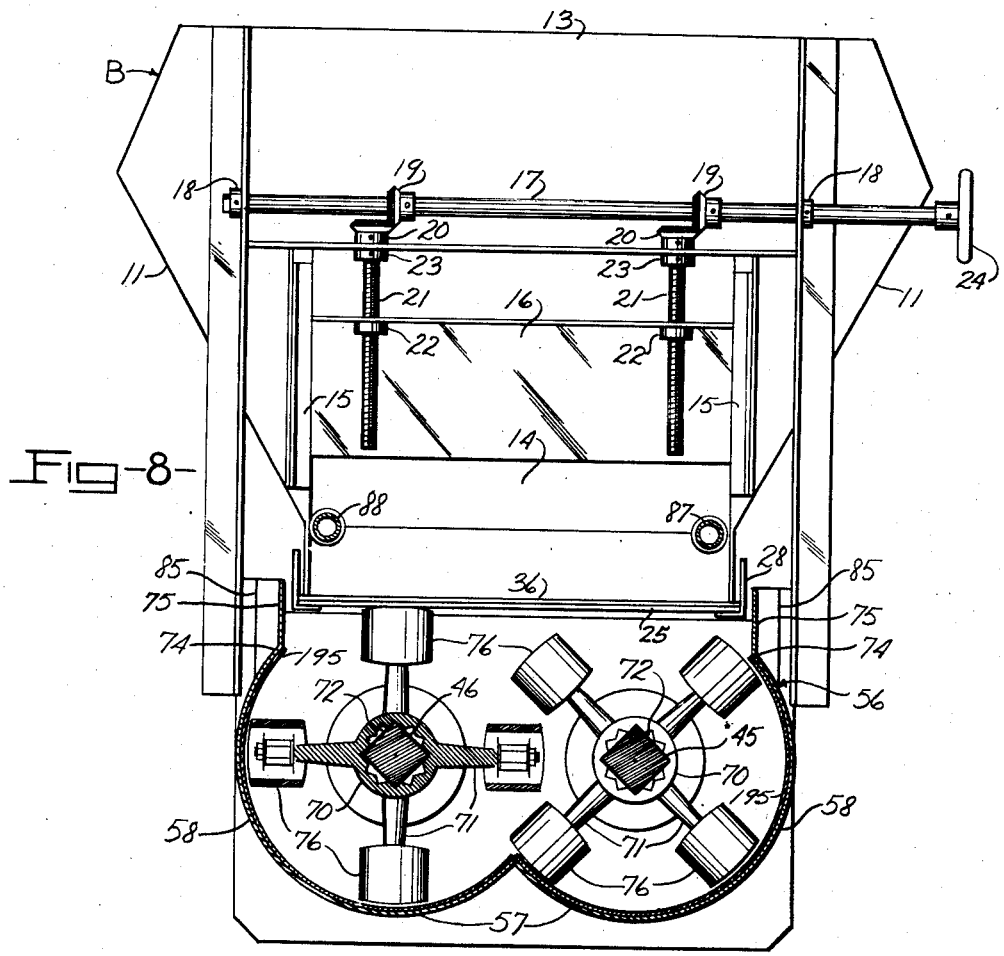
Fig-8-
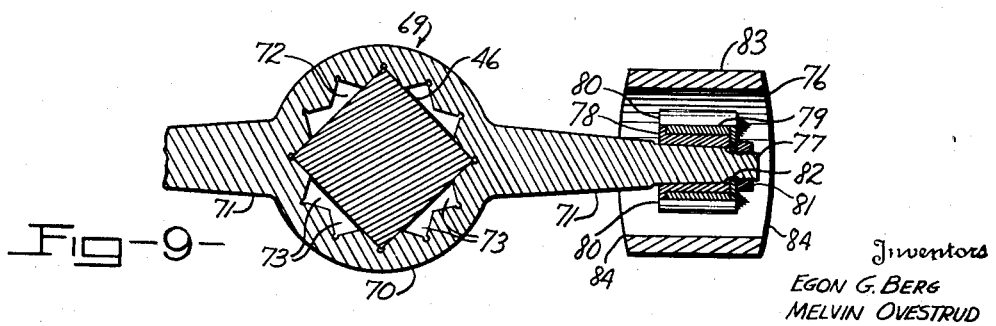
Fig-9-
Inventors
EGON G. BERG
MELVIN OVESTRUD
By Carlsen & Hayle
Attorneys

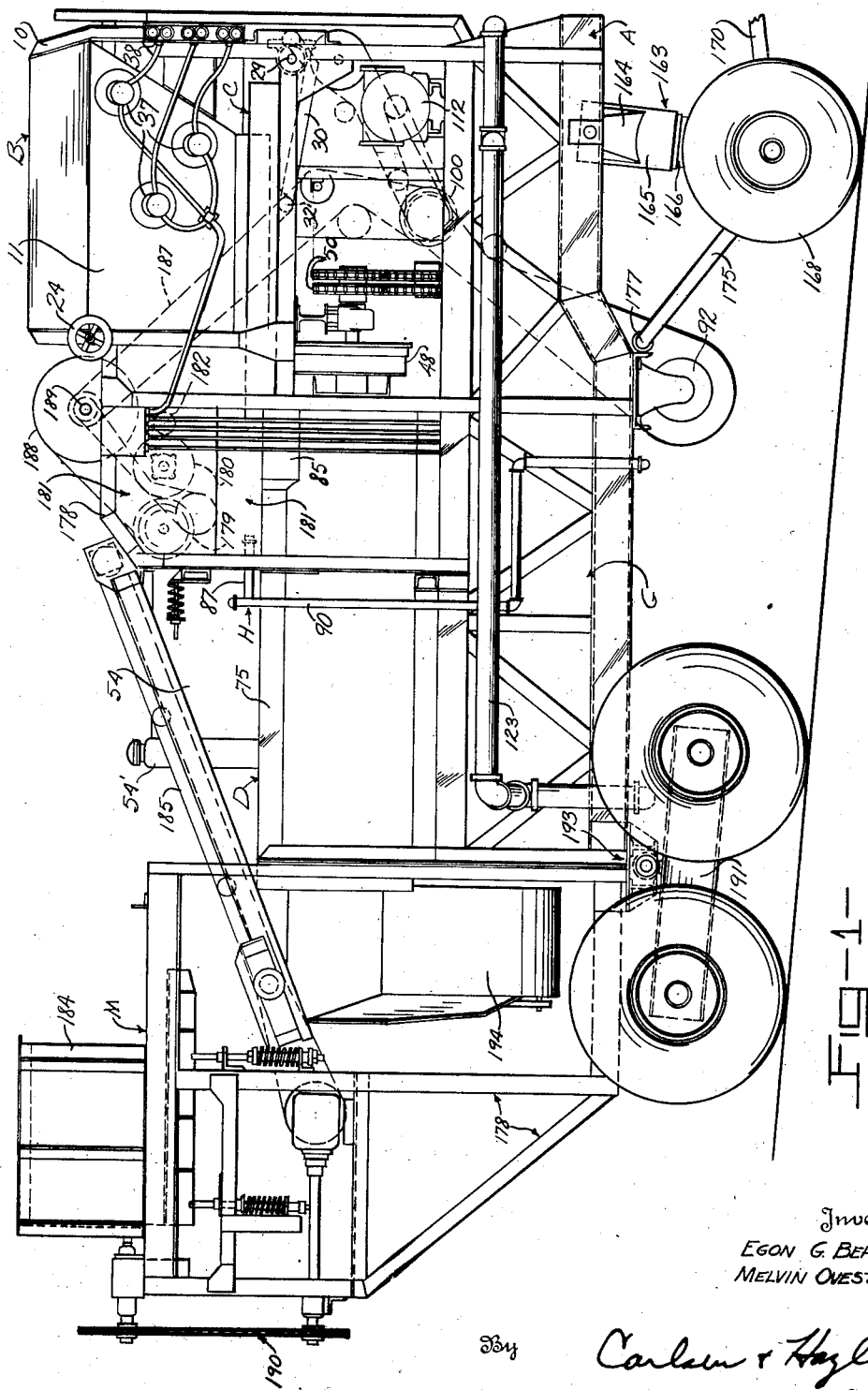

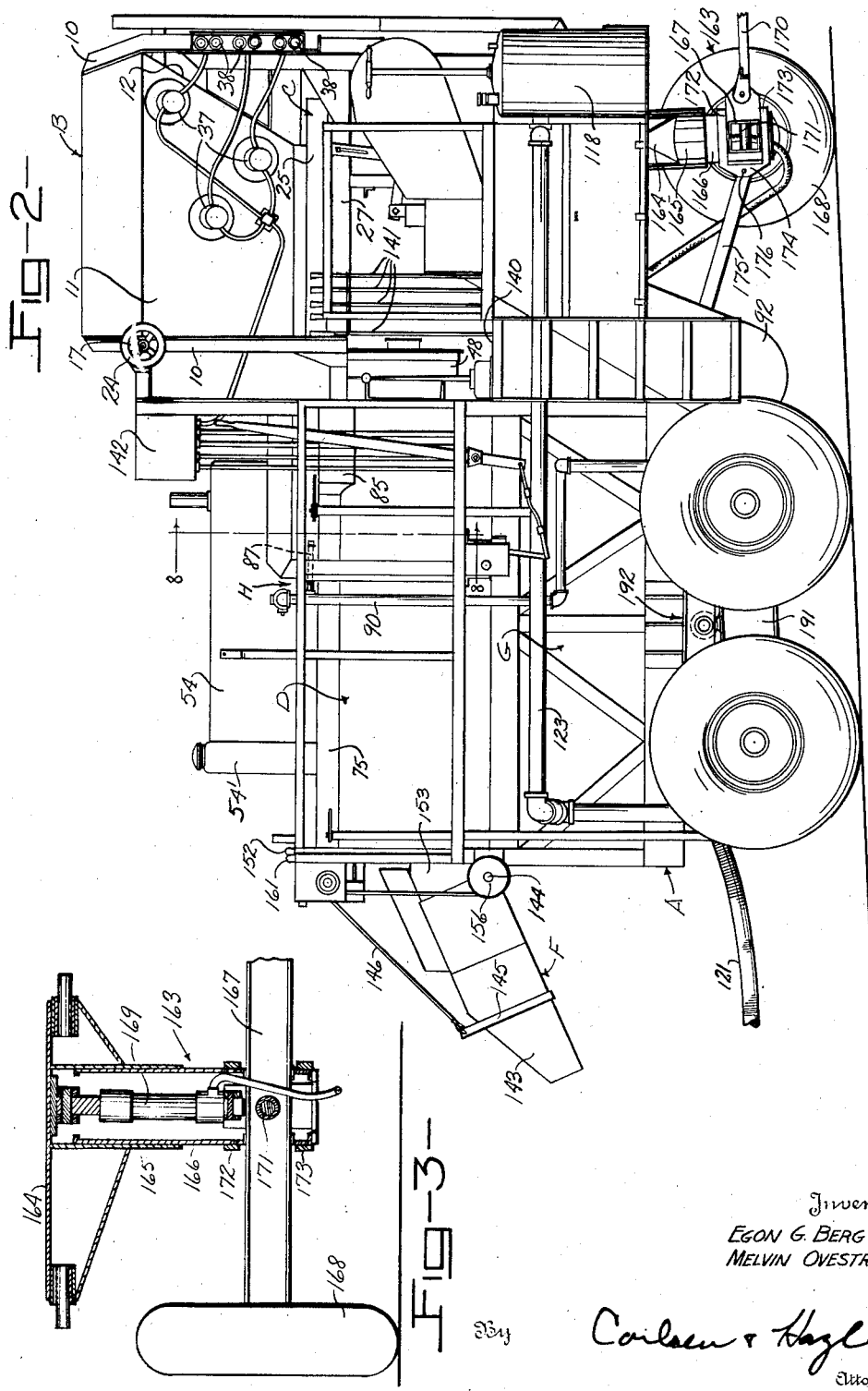

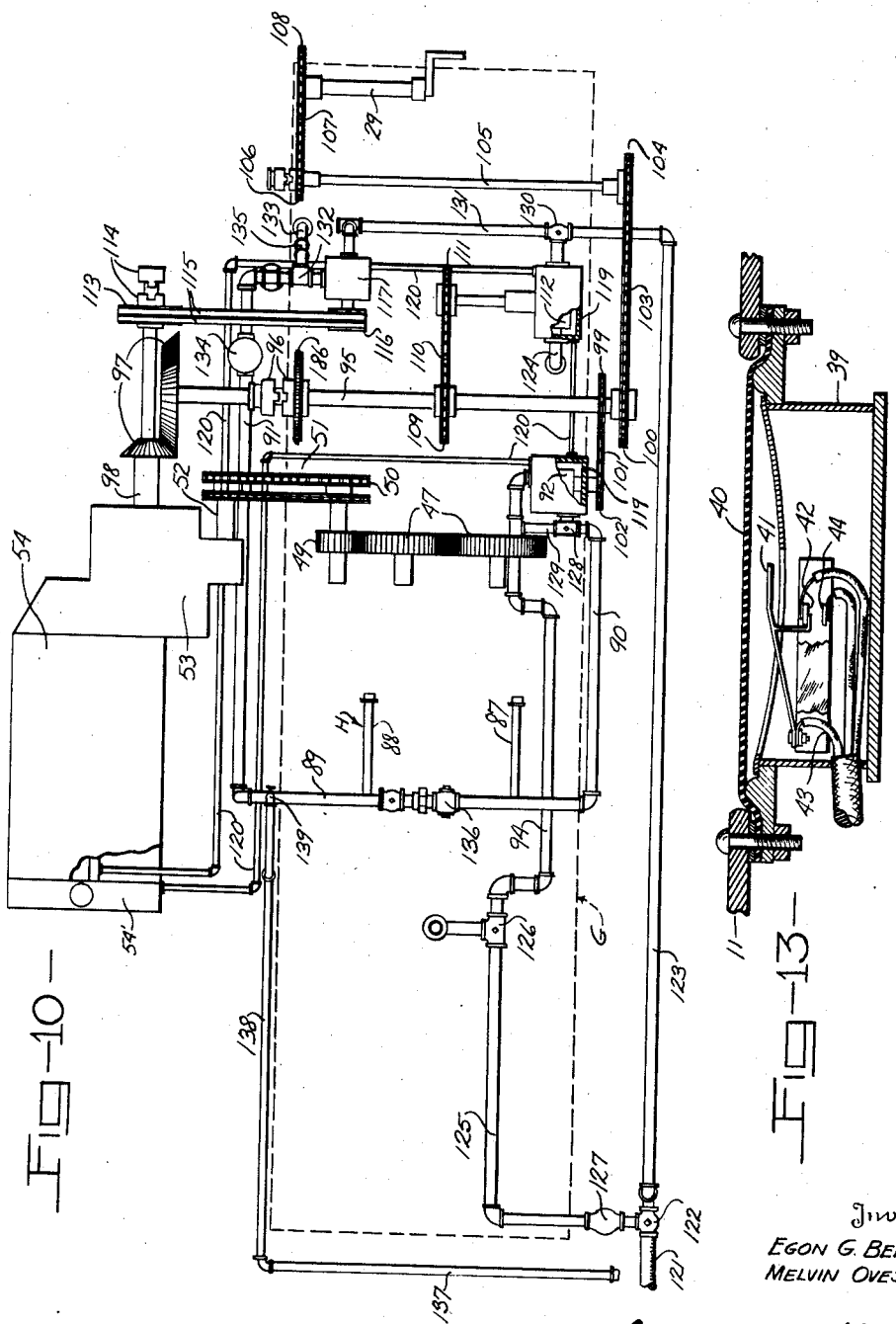

Oct. 6, 1942.  E. G. BERG ET AL  2,297,867
MIXING MACHINE
Filed Sept. 21, 1940  7 Sheets-Sheet 7
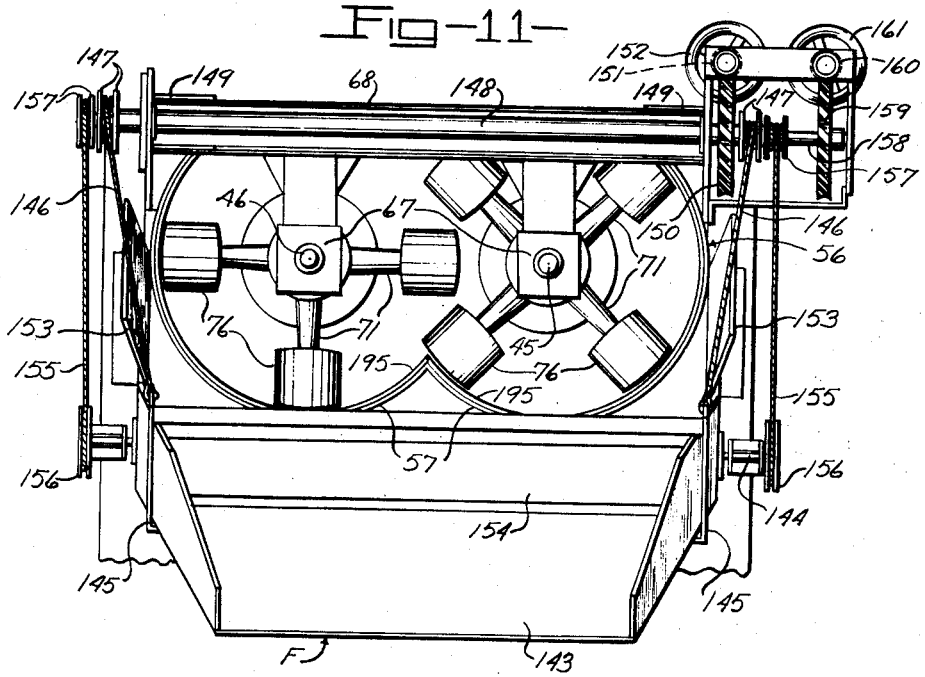
Fig-11-
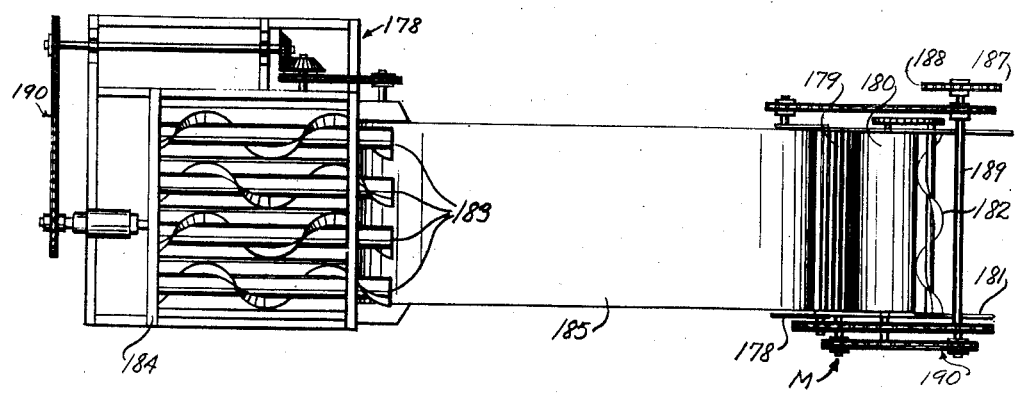
Fig-12-
Inventors
EGON G. BERG
MELVIN OVESTRUD
By Carlsen & Hayle
Attorneys Patented Oct. 6, 1942

2,297,867

UNITED STATES PATENT OFFICE 2,297,867

MIXING MACHINE

Egon G. Berg and Melvin Ovestrud, Minneapolis, Minn., assignors to Pioneer Engineering Works, Inc., Minneapolis, Minn., a corporation of Delaware Application September 21, 1940, Serial No. 357,708

8 Claims. (Cl. 259—175)

Our invention relates to improvements in machines for mixing road building materials.

Since the construction of bitulithic and stabilized roads takes in a large variety of materials it is necessary to provide a machine of wide flexibility, and the present invention accordingly provides such a machine which may be used as a stationary continuous mixing plant or as a traveling, continuously mixing, plant, and which may be used to mix any kind of aggregate or base course material with the necessary binder material or binding agent, whether this is a bituminous product or oil, water, soil, clay, or combination thereof.

The primary object of the invention is to provide a machine of this kind having means for constantly and correlatively controlling the amount and speed of the feeding of the aggregate and binder materials and the mixing operation in order to ensure thorough mixing and maintaining the proper predetermined properties of the materials at all times and under all circumstances.

A further object is to provide in such a machine means whereby the road material or aggregate may be pre-mixed before spraying or impregnation with the binder material, to thus achieve a uniformity in the dispersion of fines in the material and prevent the clotting or coagulation of these fines as the binder is added subsequent to said pre-mixing operation. The admission of the binder material to the aggregate before pre-mixing of the latter has been found to materially hinder the achievement of a proper uniformity of the mixture since the fines have a tendency to segregate into concentrated masses and they then absorb the greater part of the binder thus forming lumpy products while leaving a lessened proportion of said binder for coating the coarser parts of the base material. Such action and its deleterious results are eliminated by the "dry pre-mixing" provided by our invention.

Another object is to provide in a machine of this kind of a pug mill for mixing the materials and in which the mill housing or casing shape is such that the paddle members will mix and advance all material in an even stream without the formation of any unmixed, stagnant strata such as has been the case hitherto. A further and related object is to provide improved paddle members for the pug mill in which the blades may be adjusted to various angles relative to each other and to the axis about which they rotate to thus control and vary the rate of advance of the materials through the mill. The blades are also reversible when worn and are so designed that their mountings are at all times themselves protected from wear. Another object is to provide means for varying the speed of the pug mill so that speed may be reduced on a cold morning when mixing is difficult and then increased later in the day.

A further object is to provide a machine of this kind embodying means for maintaining operating parts substantially level while traveling along a grade and thus ensuring the constant flow and feeding of materials without influence by unusual gravitational effects.

Still a further object is to provide a hopper of improved form in which electrically operated means are incorporated for positively indicating the level of the base material therein to thereby enable the operator to keep constant check on the feed of the materials to the mixing portions of the machine.

Still another object is to provide various improvements in the binder supply means, necessary piping, binder tank heating, in the frame and transport wheel mountings, and in many other details, all of which aid in the provision of a very effective and advantageous construction as will be pointed out in greater particularity in the following detailed specification.

In the drawings—

Fig. 1 is a side view of our machine and showing the clay or soil binder feeding means.

Fig. 2 is a similar view but without the clay or soil binder feeding means.

Fig. 3 is a detail section through the front truck assembly along the line 3—3 in Fig. 2.

Fig. 4 is a plan view of the machine of Fig. 2.

Fig. 5 is an enlarged detail end view of one of the pug mill paddles.

Fig. 6 is an enlarged fragmentary cross sectional view of the feed mechanism showing the roller support therefor.

Fig. 7 is an enlarged longitudinal vertical section through portions of the feed hopper, feed mechanism and pug mill.

Fig. 8 is an enlarged fragmentary cross section along the line 8—8 in Fig. 2.

Fig. 9 is an enlarged fragmentary cross section through one of the pug mill paddle assemblies.

Fig. 10 is a partially diagrammatical view of the power operating mechanism and piping system of the machine.

Fig. 11 is a rear end view showing the delivery chute, end gate, and operating means therefor.

Fig. 12 is a plan view of the feeding mechanism for soil binder as shown in Fig. 1.

Fig. 13 is a detail cross sectional view showing one of the switches for the hopper level indicator.

Fig. 14 is a detail in longitudinal cross section of one of the front bearings for the pug mill.

Referring now more particularly and by reference characters to the drawings, the machine as shown comprises as its basic elements a wheel borne frame A which is surmounted by a surge or storage hopper B into which the road material is fed by some suitable means. When used as a traveling plant along the road the machine is pulled by a travel loader (not shown) which acts as the motive power for transporting and also picks up the road material or aggregate from the windrow along the road and feeds the material to the hopper. When used as a stationary plant the hopper may be filled by a suitable conveyor or clam shell (also not shown) and in either case the hopper is usually covered by a canvas hood or screen (not shown) to prevent the escape of the finer parts of the material.

The hopper has a feed mechanism C at its lower side which feeds the material at predetermined and selective speed and quantity to a twin pug mill designated generally at D, the material being pre-mixed while in a dry condition at the receiving end of the mill before it reaches the spraying zone E whereat the binder material or binding agent is added. The mixed material flows from the (front) receiving end of the pug mill and is returned to the road either rearwardly or to the side by a chute F.

In the construction of bitulithic roads the binder is a bituminous product or oil and same is carried in a heated tank G from which it is discharged in predetermined and selected quantity through a spray manifold or head H to the material in the spraying zone E of the pug mill. The machine shown in Fig. 1 is also equipped with mechanism M for the use of a soil binder or stabilizing material in the construction of so-called stabilized roads. The latter mechanism and its operation will be set forth in detail later in this specification.

Turning now to more detailed description of the machine, the hopper B is mounted at an upper forward portion of the frame A between upright members 10 thereof and the hopper comprises downwardly sloping sides 11 and front and rear walls 12 and 13. Both top and bottom of the hopper are open and at the lower edge the rear wall 13 is cut short to form a transverse feed opening 14. Guides 15 are secured in upright positions along the ends of the feed opening 14 and form slideways for the ends of a feed control gate 16 which may be moved up or down to vary the effective size of the opening. A shaft 17 is journaled transversely in bearings 18 above the feed opening and carries bevelled pinions 19 which mesh with similar pinions 20 on upper ends of the screws 21. Said screws have threaded engagement with tapped members 22 secured to the gate 16 and are retained against endwise displacement by the bearing members 23. Rotation of the shaft 17, by a handwheel 24 at one end, will of course turn the screws 21 and, through their threaded engagement with the gate, will raise or lower the gate as may be desired. Calibrations or an indicating means of some kind may be provided to indicate the position of the gate if so desired.

The feeding mechanism C comprises a feed plate or reciprocating feed member 25 which is arranged below the hopper B and is of rectangular shape somewhat wider and considerably longer than the bottom opening of the hopper. Bearing rollers 26 are journaled on inner sides of horizontal frame members 27 and support angles 28 which are secured to the margins of the feed plate. The plate is thus supported for fore and aft reciprocating movement immediately beneath the hopper outwardly at one end beneath the feed opening 14, and the plate in effect serves as the bottom of the hopper. Therefore when the base material or aggregate is placed in the hopper it rests upon the feed plate and runs out through the feed opening upon the rear end of said plate.

A crankshaft 29 is journaled transversely in the frame A beneath, and forwardly, of the hopper and a connecting rod 30 is pivoted at one end to an eccentric pin 31 carried by said shaft. The other end of the connecting rod is pivoted at 32 to the lower side of the feed plate 25 and the rotation of the crankshaft (by power means later to be described) will of course result in the desired reciprocation of the feed plate. As the plate moves rearwardly it will carry out a quantity of the material from the hopper and as the plate returns forwardly a portion of the material will be crowded off the rear end of the plate. The amount of material thus intermittently fed from the hopper may be controlled by the opening or closing adjustment of the feed gate 16 and the frequency of the feeding "surges" may of course be controlled by varying the speed of rotation of the crank shaft 29.

The forward lower edge of the hopper B is curved rearwardly or inwardly as designated at 33 to have a scraping relation with the feed plate 25 and, in addition, rubber or resilient wiping strips 34 are secured to this edge to ride the upper surface of the plate. The purpose of this construction is to prevent material from being carried forwardly out from beneath the hopper on the return strokes of the plate. The reciprocating action of the plate is made free and smooth by the supporting rollers 26 and by a counterweight 35 on the crankshaft 29. A special wear resisting cover plate 36 is removably mounted atop the feed plate to protect the same from wear.

It is important that the operator of the machine know approximately the level of the material in the hopper in order to prevent the possibility of running short of such material and resulting change in characteristics of the mixture. For this purpose we provide at three (more or less) vertically spaced points along one side of the hopper the micro switch units designated generally at 37 and three dual signal light units 38. Said switch units include housings 39 which are set in openings formed in one side of the hopper B to expose the yieldable or resilient diaphragms 40 to the action of the material in the hopper. Switch arms 41 in the housings normally rest in contact with the points 42 to connect a source of energy (such as a battery connected through wires 43 to each arm) with red lights of each signal light unit 38. When material is gathered in the hopper, however, it presses upon the diaphragms 40 of the switch units to move the switch arms to the contact points 44 thus connecting the energy source to green lights of the signal unit, simultaneously disconnecting the warning red lights. It is thus apparent that the operator may at a glance note the quantity of material in the hopper at any time by the relative showing and positions of the illuminated red and green signal lights.

The mixing device or pug mill D is arranged to the rear and below the level of the hopper B and extends generally lengthwise in the frame A in which it is rigidly supported. The mill comprises a pair of parallel, horizontally extended and transversely spaced shafts or axles 45—46 which at their forward ends carry meshing drive gears 47 within the gear housing 48. A drive pinion 49 meshes with one gear 47 and is in turn driven through sprocket gears 50 and chain 51 from a power take-off shaft 52 of a gear reduction and change speed mechanism 53. This mechanism is connected to a power unit 54 of the internal combustion engine type which is mounted at one side of the frame A upon a lateral, horizontal platform 55 secured along the frame. The power unit rotates the shafts 45—46 in opposite directions by the driving mechanism described and the speed may be varied by control of the change speed mechanism 53.

The pug mill housing 56 is formed of sheet material to the generally trough-like shape shown having a rounded bottom 57 and upstanding sides 58 leaving the top and the rear end open. At the front end an end plate 59 is rigidly mounted to close the housing and the shafts 45—46 extend loosely through openings 60 (Fig. 14) in this plate. A transverse frame member 61 then carries a pair of rigidly mounted bearing drums 62 (which also support the gear housing 48) within which anti-friction bearings 63 support the shafts. Sealing collars 64 are secured to the shafts to rotate within collars 65 mounted in the end plate openings 60 and these collars have interfitting annular tongue and groove mechanisms 66 which effectively seal the bearings against the entrance of foreign matter of all kinds.

At their rear ends the shafts 45—46 are journaled in anti-friction bearings 67 depended in properly spaced relation from a rigid transverse frame member 68 extended above the pug mill housing. All of the bearings are protected with oil seals in accordance with the usual good practice.

The shafts 45—46 are multi-lateral in cross section, preferably square, and arranged in series on each shaft are the paddle supporting members 69 which comprise hubs 70 and radially directed arms 71. The hubs 70 have openings 72 which are of twelve-pointed or star-shape, thus providing twelve right-angle reentrant recesses 73, any four of which will receive and nicely slide (but not rotate) upon the corners or edges of the shafts. The hubs may thus be slipped or assembled endwise upon the shafts until they occupy substantially the entire available length of the shafts within the housing although, as a matter of course, greater or less spacing may be provided by suitable interpositioned collars (not shown) as may be desired.

The arms 71 extend radially from the shafts 45—46 and when rotated with the shafts the outer ends of the arms travel annular paths which overlap centrally between the shafts due to the fact that the shafts are spaced apart a distance less than twice the radial length of the arms. The housing bottom 57 and lower side portions are curved to nicely follow the path of the arms as clearly shown and in addition the upper portions of the sides 58 are curved inwardly on the same radii to points 74 located well above the level of the shafts. From these points the sides extend straight upwardly some distance as designated at 75. This housing shape is of paramount importance in the improved functioning of our pug mill as will presently appear. Paddle members or blades 76 are mounted on the arms 71 and each is of flattened or oval form when viewed from the end and has an opening from end to end to loosely receive the tapered and screw threaded outer ends 77 of the arms. A mounting member comprising a tapered compression sleeve 78 is mounted on each arm end 77 and fits within the hexagonal, expansion sleeve or socket member 79 which in turn enters between lugs 80 cast on the inside of the paddles. A nut 81 is threaded on each arm end against a washer 82 and when screwed home compresses the sleeve 78 on the tapered section of the arm and expands the sleeve 79 against the lugs 80 to thus lock the paddle on the arm against any movement. However, the paddle may be adjusted to any desired angle about a line extended radially with respect to the shaft by loosening the nut 81 and turning the sleeve 78 upon the tapered end of the arm. And of course the blade may be entirely removed by removing the nut 81.

When all of the arms 71 are thus equipped with the paddles 76 the paddles, by assuming angular positions with respect to the arms, may act as screws to move material in the mill housing parallel with the shafts 45—46. At the same time the material will be subjected to a violent tossing and mixing action as will be evident. The rate of advance of the material may be readily varied (in addition to that provided by change in the speed of rotation of the shafts) simply by varying the angle or pitch of the paddles 76. Also the relative radial angles between adjacent arms 71 on each shaft may be varied in steps of thirty (30) degrees by setting up the hub 70 on the shaft in desired angular positions, this being the purpose of the twelve pointed openings 72 in said hubs. For example with each arm following the other at a differential of thirty (30) degrees in the radial angle the paddles would approach the action of a spiral ribbon conveyor and the material would be advanced very rapidly. The reverse is of course true and the setting of adjacent arms on the same shaft at greater divergent angles would diminish the rate of advance.

The paddles 76 constructed as described of course have two similar working faces 83 and ends 84 either of which may be disposed forwardly in working engagement with the material simply by reversing the paddles on the arms. The effective life of the paddles is thus substantially doubled. In either case, and at any setting of the paddles the mounting means, constituted by the sleeves and nuts, is located within the paddles and thus protected from wear producing contact with the materials in the mill.

The forward end portion of the pug mill housing 56 has upwardly extending walls 85 defining a feed opening 86 which is located immediately beneath the rear delivery end of the feed plate 25 to receive material therefrom. The portion of the mill below and immediately to the rear of the feed opening 86 constitutes a pre-mixing zone or chamber represented in Fig. 7 by reference character E'. Rearwardly following is the spraying zone hereinbefore referred to at E and in turn following and extending to the rear of the mill is the main mixing portion of the mill which may be represented at E".

Liner plates 195 are provided within the pug mill housing to save the housing from wear. These plates may of course be readily removed through the open rear end of the mill housing and replaced when worn, and are substantially semi-circular in cross section and through shaped to follow the contour of the bottom and sides of the housing, as best shown in Fig. 8.

Arranged over the spraying zone E is the spray manifold or head designated generally at H and which in one form comprises a pair of perforated spray pipes 87—88 which are disposed horizontally over, and parallel to, the shafts and paddle assemblies in the pug mill. A liquid binder or binding agent such as a bituminous product is supplied under pressure to these pipes 87—88 (by means to be described) and is sprayed in a curtain downwardly and inwardly upon the road material in the mixing mill.

In the operation of the machine as thus far described it is evident that the base course material or aggregate as it is fed from the hopper B by the feed mechanism C will enter the receiving end of the pug mill and will be subjected to a violent tossing and mixing action in the preliminary portion E' thereof. This action disperses the fines evenly throughout the aggregate and at the same time advances the material to the zone E below the spray manifold H where it is sprayed with the binding agent. Continuation of the mixing action then thoroughly mixes the road material and binding agent and carries the mixture rearwardly for discharge from the mill. The dispersion of the fines in the material prior to admission of the binder prevents the absorption by the fines of more than their proportionate share of the binder with resulting clotting and uneven mixing as has been heretofore set forth.

The shape of the pug mill housing wherein upper portions of the sides 58 follow the path of the blades to points above the level of the axes of the mixing devices is of importance in that this housing shape causes the material which is worked up outwardly alongside the paddle devices to be tossed back toward the center and prevents the formation of stagnant strata in the mill. Where the side walls in prior mills have extended straight upwardly from points in horizontal alignment with the axes of the shafts, is has been found that V-shaped strata of material have accumulated along the sides of the mill and gradually worked out to the delivery end in the form of unmixed lumps. Such action is of course very undesirable in its effect on the mixture and is entirely overcome by our pug mill as herein described.

The spray pipes or bars 87—88 are supported by and connected to a transversely extended header pipe 89 having downwardly extending portions 90—91 at opposite ends. One portion or pipe 90 is connected directly to a pump 92 which is arranged at the underside of the frame A beneath a large supply tank G mounted from end to end in the lower portion of the frame. The pump 92, hereinafter termed the feeder pump, is of the rotary type which meters out an exact predetermined quantity of fluid at each rotation and it receives fluid from the tank G by a suction pipe 94 connected to the bottom of the tank. Adequate and continuous suction is provided by the mounting of the pump beneath the tank and it is apparent that the operation of the pump will feed fluid (binding agent) from the tank to the spray manifold H for discharge thereby into the material in pug mill D.

The driving connections to and between the feed mechanism, pug mill and feeder pump, are important and will now be described. A main countershaft 95 is journaled transversely in the frame and at one end (shown best in the diagram of Fig. 10) is driven by a clutch 96 and gears 97 from a constant speed power take-off shaft 98 of the hereinbefore described gear reduction and speed change mechanism 53. At the opposite end the countershaft 95 carries sprockets 99—100 one of which is connected by chain 101 to the drive sprocket 102 of the feeder pump. The other sprocket 100 is connected through chain 103 to the sprocket 104 on a secondary countershaft 105 which also carries a sprocket 106 connected by chain 107 to sprocket 108 on the feeder driving crankshaft 29. It is apparent now that both the feeder mechanism C (reciprocating) and the feeder pump 92 will be driven at a constant relative speed and that therefore certain predetermined quantities of both road material and binding agent will be delivered to the pug mill. Any minor variations in the rate of feed (such as fluctuations of engine speed) will be at the same rate for both materials and the same proportion will maintain at all times. The speed of the pug mill on the other hand may be varied at will by actuating change speed mechanism 53 to vary the speed of rotation of the take-off shaft 52 (without effect on take-off shaft 98) to thus control the mixing time as may be desired. This control of the pug mill speed is also of great advantage in that the speed may be reduced when the machine is used on a cold morning and then increased as the material warms up and becomes easier to mix.

The relative proportions of road material and binding agent may be preselected by changing the sprockets 99—102 and 100—104 (or 106—108) to others of different diameter as will be understood.

Completing the driving mechanism are a sprocket 109 on main countershaft 95 for driving (through chain 110 and sprocket 111) the transfer pump 112 and a pulley 113 and clutch 114 on the take-off shaft 98 for driving (through belts 115 and pulley 116) a water pump 117. The purpose of these pumps will presently appear.

The tank G is preferably insulated against heat loss and is provided with heating means (not shown) in order to keep the binding agent (particularly when of a bituminous nature) at a proper operating temperature. Fuel supply for the heating means may be provided by the fuel tank 118. The feeder pump 92, and transfer pump 112, are provided with heating jackets 119 and heated water from the radiator 54' of the power unit 54 (under thermostatic control) is conducted through conduits 120 to the jacket in order to heat the pump and prevent sticking by coagulated binder therein. Protective shear pins (not shown) may of course be used in each pump.

The tank G is supplied with the binding agent from a relay tank truck (not shown) by means of a hose 121 which is connected to a three-way valve 122 located at a rear lower corner of the machine. From this valve there runs a pipe 123 to the intake of the transfer pump 112 and this pump discharges the liquid into the tank through the connection 124.

Under some circumstances, as for instance when starting up the work, it is desirable to circulate the binding agent through the tank and pumps as it is being heated. For this purpose the valve 122 is adjusted to shut off the connection to the hose 121 and open the pipe 123 to an intake pipe 125 leading to a three-way valve 126 having connection through the feed pump suction line 94 with the tank bottom. The material may now flow from the tank through pipes 123 and 125 (when valve 126 is adjusted) and through pump 112 back to the tank setting up a continuous circulation in this part of the system. A flap or check valve 127 is provided to isolate the circulating pipe 125 when pumping from the hose 121.

The feeder pump 92 discharges through a three way valve 128 which normally connects its output to the line 90 leading to the spray manifold, but this valve may also be adjusted to discharge from the pump through the return pipe 129 back to the pipe 92 to circulate material through this pump as well.

As heretofore stated, water is sometimes used instead of a bituminous binding agent and for this purpose the following provision is made. The pipe 123 feeds the transfer pump 112 through a three way valve 130 and this valve may connect the intake either to this pump or to a line 131 leading to the intake of the water pump 117. This pump discharges through a branch connection 132 to a line 133 leading to the tank G and through a meter 134 and connecting lines to the pipe 91 leading to the spray manifold H. Water may thus be taken from a tank wagon or truck (not shown) through the hose 121 and fed both to the tank G and to the spray manifold. A pressure responsive valve 135 is interposed in the line 133 to regulate the feed to the tank. A three way valve 136 in the cross or header pipe 89 connects the spray pipes 87—88 to either of the pipes 90—91 and prevents feeding back the binding agent or water to parts of the system not in use. It is evident that some parts of the system thus are used for both bituminous and water binding agents. When the tank truck has been emptied the suction line of pump 117 may be connected to the bottom of the tank by adjusting valve 122.

Under some circumstances the road is sprinkled in advance of the material as it is deposited on the road and for this purpose a spray bar 137 is located transversely at the rear lower end of the machine and connection is made through piping 138 to the header 89 to receive water therefrom. A valve 139 controls the feed of the water to the spray bar as will be apparent.

An operator's platform 140 is arranged alongside the frame A with steps leading upward, and a series of levers 141 are provided and connected to the various valves, clutches, and change speed mechanism to provide convenient, centralized control from this platform. The various controls and indicating gauges for the power unit are also remotely actuated and located in a box 142 convenient to the operator's position on the platform.

At the rear delivery end of the pug mill D is provided the combination delivery chute and end gate assembly F. This comprises a chute 143 pivotally mounted at a lower forward corner over a transversely journaled shaft 144. A yoke 145 on the chute is connected to the ends of cables 146 which are coiled at their other ends over drums 147 secured to a tubular member 148 journaled transversely of the frame A in brackets 149 secured to rear portions thereof above the chute. A worm gear 150 on one end of the member 148 is engaged by a worm 151 carried by the shaft of a hand wheel 152 and by turning this wheel it is apparent that the chute 143 may be raised or lowered to any desired angular position. Side wings 153 extended from the rear of the frame prevent material from working clear of the forward end of the chute as it is adjusted.

An end gate 154 is secured to the shaft 144 and may be adjusted thereby to open or close the rear end of the pug mill as may be desired. For this purpose cables 155 are trained over pulleys 156 at the ends of the shaft 144 and over drums 157 secured to the ends of a shaft 158 journaled through the tubular member 148. A worm gear 159 secured to one end of the shaft 158 is engaged by a worm 160 on the shaft of a hand wheel 161 and by turning the wheel the end gate may be adjusted. The worm and gear drive for these adjustments of course make them self-locking.

As heretofore stated the delivered material may be carried off from the pug mill in any type of conveyor which may be desired. A screen or grill designated generally at 162 is provided over the rear portion of the pug mill housing 56.

In the operation of the machine as a travel-mix plant it will frequently of course encounter grades in the road and thus become inclined either forwardly or rearwardly. Such inclination, unless compensated for, will influence the rate of travel of the material in the pug mill and the rate of feed as will be apparent. In accordance with our invention the front steering truck 163 is provided with leveling means as will now be described. A transversely extended bolster member 164 is pivoted on a transverse axis in the forward end of the frame A and carries a rigidly mounted sleeve 165 which telescopes over a sleeve 166 connected to the axle 167 of the truck, the wheels 168 of course being journaled at the ends of said axle. A hydraulic ram or jack 169 is arranged in the sleeves 165—166 and braced between the ends thereof and operation of this ram as by a hand pump (not shown) will of course relatively and vertically expand or contract the slip joint provided by the sleeves to thus raise and lower the front end of the frame relative to the road. It is thus readily possible to level the frame at any usual grade in the road and thus free the feeding and mixing operation of gravitational effects. This action will be evident from Figs. 1 and 2.

The telescoping sleeves 165—166 also are relatively rotatable to permit steering movements of the front truck and the tongue 170 for transmitting draft to the machine is pivotally connected on horizontal transverse axes to the axle. A fore and aft extended pivotal connection 171 between the bolster and sleeve 165 permits up and down differential movements of the wheels 168 to compensate for minor inequalities in the road surface.

To free the bolster and sleeves of draft stresses rings 172—173 are provided around the lower sleeve 166 and are joined rearwardly by a yoke 174. A radius arm 175 is pivoted at 176 to said yoke and at 177 to the frame to transmit the main draft forces directly to the frame. The tiltable mounting of the bolster 164 in the frame permits the necessary swinging movements of the parts as the frame is raised or lowered with respect to the truck.

The mechanism M for metering and feeding a soil, clay, cement or silicon binding agent to the material in the mill comprises a frame designated generally at 178 which is supported (removably if desired) from the rear of the main frame A. A pair of shredding rollers 179—180 are arranged transversely in a hopper-like housing 181 in the frame 178 over the pug mill housing 56 and substantially over the spraying zone E thereof. One of these rollers 179 has cutting knives while the other 180 is smooth and they are rotated at a differential in speed so that the binder material will have all lumps disintegrated before it drops from between the rollers into the pug mill for mixing therein with the aggregate or base course material. The differential in speed also has a tendency to throw rocks or similar heavy objects over forwardly in the housing 181 carrying the rollers, and these particles are received and discharged out to one side by a spiral conveyor 182.

The binder material is fed to the rollers 179—180 in predetermined and regulated quantities by metering screws 183 arranged beneath a receiving hopper 184 into which the material is initially fed by any suitable conveyor or feeding means (not shown). These screws meter out the material and drop it onto a conveyor 185 which carries it upwardly and forwardly for discharge onto the shredding rollers 179—180. Obviously the metering screw and hopper mechanism might be a separate unit (particularly in fixed plant operation) and connected to the shredding roller and hopper by a longer conveyor if so desired.

The entire mechanism M as here shown is driven from the main countershaft 95 by a sprocket 186 and chain 187 leading to a sprocket 188 on a drive shaft 189 carried by the housing 181. From this shaft 189 various sprockets and chains designated generally at 190 drive the rollers 179—180, the conveyors 182—185 and the metering screws 183 as clearly shown. Obviously the speed of rotation of the metering screws 183 is interlocked with the rate of reciprocation of the feed plate 25 to thus preserve the proper preselected proportions of aggregate and binding material at all times.

The rear wheeled truck 191 supporting the rear end of the machine ordinarily is secured at a forward mounting 192 (Fig. 2) beneath the frame when the mechanism M is not used. When this mechanism is used, however, the truck is moved rearward to mounting 193 (Fig. 1) to better equalize the weight distribution. A side delivery conveyor as represented at 194 in Fig. 1 is preferably used when a clay or soil binder is being used and the mechanism M is in place.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a material mixing device of the character described, a rotatable shaft, an arm extending outwardly from the shaft, a paddle member mounted on the arm for oscillating adjustments thereon to thereby dispose the member angularly with respect to the shaft, a compression member on the paddle member, the said arm having a tapered end to engage the compression member, and means for releasably forcing said compression member into frictional engagement with the tapered end of the arm to thereby secure the paddle member in adjusted position on the arm.

2. In a material mixing device, a shaft, an arm mounted in an outwardly extending position on the shaft and having a tapered and threaded outer end, a material engaging paddle, a compression sleeve fitted on the tapered end of the arm, a nut threaded on the arm to urge said sleeve into adjustable frictional engagement with the arm, and a socket member on the paddle adapted to non-rotatably engage the said compression sleeve.

3. In a material mixing device, a shaft, an arm mounted in an outwardly extending position on the shaft and having a tapered and threaded outer end, a material engaging paddle, a compression sleeve fitted on the tapered end of the arm, a nut threaded on the arm to urge said sleeve into adjustable frictional engagement with the arm, an expansion sleeve non-rotatably engaging the said compression sleeve, and lug members on the paddle to non-rotatably and frictionally engage the said expansion sleeve.

4. In a material mixing device, a rotatable shaft, an arm extending outwardly from the shaft, the outer end of said arm having a rounded and tapered portion, a paddle member, a mounting member connected to the paddle member, said mounting member having an opening to fit over the tapered portion of the arm, and a nut threaded on the outer end of the arm to urge said mounting member into frictional engagement with the tapered portion of the arm.

5. In a material mixing device, a rotatable shaft, an arm extending outwardly from the shaft, the outer end of said arm having a rounded and tapered portion, a paddle member, a mounting member having an opening to engage the tapered portion of the arm, a nut threaded on the extremity of the arm and adapted to urge said mounting member along the arm toward the shaft and into frictional engagement with the tapered portion of the arm, and the said paddle member being adjustably and removably connected to said mounting member.

6. In a material mixing device, a rotatable shaft, an arm extending outwardly from the shaft, the outer end of the said arm having a tapered portion, a paddle member, a mounting member having an opening to engage the tapered portion of the arm, a nut threaded on the extremity of the arm and adapted to urge said mounting member into frictional engagement with the tapered portion of the arm, and the said paddle member being removably connected to said mounting member.

7. In a material mixing device, a rotatable shaft, an arm extending outwardly from the shaft, the outer end of the said arm having a tapered portion, a paddle member, a mounting member connected to the paddle member, said mounting member having an opening to fit over said tapered portion of the arm, and threaded means engaging the arm and operative to urge said mounting member into frictional engagement with the tapered portion of the arm to thereby secure the paddle member in adjusted position on the arm.

8. In a material mixing device, a rotatable shaft, an arm extending from the shaft and having a tapered end portion, a paddle member, means for mounting the paddle member on the arm and said means having an opening to frictionally engage said tapered end portion of the arm, and means having threaded engagement with the arm for urging said mounting means into frictional engagement with the tapered end portion of the arm.

EGON G. BERG.
MELVIN OVESTRUD.